US006716784B2

(12) United States Patent
Corma Canós et al.

(10) Patent No.: US 6,716,784 B2
(45) Date of Patent: Apr. 6, 2004

(54) CATALYTIC CRACKING MATERIALS BASED ON ITQ-7 ZEOLITES AND THEIR USE IN HYDROCARBONS CRACKING PROCESSES

(75) Inventors: Avelino Corma Canós, Valencia (ES); María Diaz Cabañas, Valencia (ES); Joaquín Martinez Triguero, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 10/252,955

(22) Filed: Sep. 23, 2002

(65) Prior Publication Data

US 2003/0100439 A1 May 29, 2003

Related U.S. Application Data

(63) Continuation of application No. PCT/ES01/00117, filed on Mar. 23, 2001.

(30) Foreign Application Priority Data

Mar. 24, 2000 (ES) ................................................ 0000789

(51) Int. Cl.[7] ................................................ B01J 29/06
(52) U.S. Cl. ............................. 502/67; 502/64; 502/65; 502/73; 502/77; 502/79
(58) Field of Search ............................. 502/64, 65, 67, 502/73, 77, 79

(56) References Cited

U.S. PATENT DOCUMENTS 4,898,846 A * 2/1990 Edwards et al. ............... 502/67

2003/0045763 A1 * 3/2003 Corma Canos et al. ..... 585/467

FOREIGN PATENT DOCUMENTS

| EP | 186446 | | 7/1986 |
| EP | 350331 | | 1/1990 |
| EP | 1148027 | A1 | 10/2001 |
| EP | 1252927 | A1 | 10/2002 |
| ES | 2023835 | | 2/1992 |
| WO | WO 00/37360 | * | 6/2000 |

OTHER PUBLICATIONS

Corma, A et al; The use of ITQ-7 as a FCC Zeditic Additive; J. Catal. (2001), vol. 197, No. 1, pp. 151–159, ISSN 0021–9517.

* cited by examiner

*Primary Examiner*—Tom Dunn
*Assistant Examiner*—Christina Ildebrando
(74) *Attorney, Agent, or Firm*—Klauber & Jackson

(57) ABSTRACT

Catalytic compositions are described for hydrocarbons cracking containing at least two zeolitic components of which at least one zeolitic component containing aluminium in its structure is selected from among ITQ-7 zeolites, intergrowths of ITQ-7 zeolites, ITQ-7 zeolites exchanged with rare earths, intergrowths of ITQ-7 zeolites exchanged with rare earths, and combinations of them. These combinations are of utility as catalysts for cracking in FCC units and permit $C_3$ and $C_4$ olefins to be efficiently obtained along with high yields of gasoline. Also described is the use of a zeolitic material containing aluminium in its structure and selected from among ITQ-7 zeolites, intergrowths of ITQ-7 zeolites, ITQ-7 zeolites exchanged with rare earths, intergrowths of ITQ-7 zeolites exchanged with rare earths, and combinations of them, as a catalytic material in hydrocarbon catalytic cracking processes.

21 Claims, No Drawings

CATALYTIC CRACKING MATERIALS BASED ON ITQ-7 ZEOLITES AND THEIR USE IN HYDROCARBONS CRACKING PROCESSES

This application is a continuation of PCT/ES01/00117, filed Mar. 23, 2001.

TECHNICAL FIELD OF THE INVENTION

This invention belongs to the field of catalysts for catalytic cracking of hydrocarbons and more particularly to the sector of zeolitic catalysts.

STATE OF THE ART PRIOR TO THE INVENTION

Owing to the elimination of tetraethyl lead from gasolines, and to the possible future elimination of methyl tert butyl ether (MTBE) as an additive for gasolines, there is considerable interest in increasing the octane rating of each of the streams making up the final gasoline. Among these streams, the one coming from fluid catalytic cracking (FCC) represents on average terms a value close to 30% of the total. Owing to its relative importance, any increase occurring in the barrel octane rating of FCC gasoline has a considerable economic impact. The octane rating of gasoline produced in the FCC unit can currently be increased by modifying the operating conditions of the unit, such as for example increasing the temperature of the reactor. Nevertheless, this solution entails a major increase in gases and, in particular, in undesired dry gas, with the consequent loss of gasoline. Better results are obtained by using new catalyst compositions that include the use of zeolite mixtures. So, in the bibliography of patents (see for example, U.S. Pat. Nos. 3,758,403, 3,894,931, 3,894,933, 4,309,279, 4,309,279, 4,339,354 and 4,309,280, among others), as well as in the available literature (see for example: Biswas, J., and Maxwell, I. E., Applied Catalysis 58, 1–18 (1990); Dwyer, F. G. and Degnan, T. F., Studies in Surface Science and Catalysis 76, 499 (1993)), it has been demonstrated that an increase in the octane rating of FCC gasoline occurs when Y zeolite mixed with ZSM-5 is used in the same FCC catalysis particle, or when using a mixture of different particles in which some correspond to the conventional cracking catalyst which uses Y zeolite and other particles contain ZSM-5 zeolite. The use of ZSM-5 zeolite as an additive in FCC catalysts also leads to an increase in $C_3$ and $C_4$ olefins which are also of great interest from the commercial point of view (see for example, U.S. Pat. Nos. 3,758,403, 3,769,202, 3,894,931, 3,894,933, 3,894,934, 3,926,782, 4,309,280, 4,309,279, 437,458 and Buchanan, J. S., and Adewuyi, Y. G., Applied Catalysis: A General, 134, 247 (1996); Madon, R. J., Journal of Catalysis 129 (1), 275 (1991)).

Nevertheless, it is known (Studies in Surface Science and Catalysis, vol. 76, 499 (1993)) that the introduction of ZSM-5 zeolite has little or no influence on the total conversion and it also produces a diminution in the total quantity of gasoline produced.

It would be interesting from the point of view of both producing an increase in the barrel octane rating of gasoline and in increasing the yield of $C_3$ and $C_4$ olefins to find other zeolites which would also permit the feed to be converted with the minimum loss of gasoline. Numerous medium and large pore zeolites have been studied for this purpose. The use of MCM-22, Omega, L, mordenite and BEA zeolites can be highlighted (see for example: J. Catal. 165, 102 (1997); Stud. Surf. Sci. and Catal. 46, 115 (1989); U.S. Pat. No. 5,314,612, EP 489324, U.S. Pat. Nos. 474,292, 4,137,152, EP 350331, FR 2661621).

The present invention has the aim of overcoming the aforementioned drawbacks of catalytic materials found in the state of the art by means of zeolitic material based on a new zeolite known as ITQ-7 (Villaescusa, L. A., Factores directores de estructura en la sintesis de zeolitas en medio fluoruro. Doctoral thesis from the Polytechnic University of Valencia, Valencia, Spain (1999), (Angw. Chem. Int. Ed., 38, 1997 (1999)) in compositions suitable for FCC, and the use of those materials in catalytic cracking. The pore topology in ITQ-7 zeolite confers on it activity for converting FCC feeds, and also, both on its own and in combination with other zeolites, it enables it to produce a good barrel octane rating of the gasoline that is produced and a good yield of $C_3$ and $C_4$ olefins, with good yields of gasoline being obtained at the same time.

DESCRIPTION OF THE INVENTION

The present invention refers on the one hand to a catalytic composition for hydrocarbons cracking containing at least two zeolitic components of which at least one zeolitic component containing aluminium in its structure is selected from among ITQ-7 zeolites, intergrowths of ITQ-7 zeolites, ITQ-7 zeolites exchanged with rare earths, intergrowths of ITQ-7 zeolites exchanged with rare earths, and combinations of them.

In accordance with the invention, the first component can be present in a proportion of between 2 and 40% of the total weight of zeolitic components present in the composition, in particle form and/or embedded in a matrix, alone or in combination with other components.

In one design of the composition of the invention, the zeolitic components also consist of, as well as the first zeolitic component, at least a second zeolitic component selected from among faujasite zeolites, faujasite zeolites at least partially exchanged with rare earths, cracking catalysts based on faujasite and combinations of them, in which case the composition can, with respect to the total weight of zeolitic components, include 2–40% by weight of the first zeolitic component and 2–98% by weight of the second zeolitic component. In this case, the first zeolitic component can be embedded in a matrix stabilised with phosphorus in which the weight of the first zeolitic component referring to the sum of the weights of the first zeolitic components and of the matrix lies between 10 and 70% by weight.

In another design of the invention, the composition consists of a mixture of particles of zeolitic components which includes particles of the first component in a matrix,
particles of the second component, and
particles of ZSM-5 zeolite in a matrix.

This mixture of particles of zeolitic components preferably consists of a maximum of 80% by weight of particles corresponding to the first component in the matrix and ZSM-5 zeolite in a ratio by weight of ZSM-5 zeolite/first component$\leq 10$, and at least 20% of the second component.

The composition can also consist of at least one binder selected from among silica, silica-alumina, alumina, $P_2O_5$ and combinations of them, and optionally, a conventional catalytic cracking additive as well. In this case, the binder can be present from 5 to 20% by weight referring to the total weight of the matrix, and the conventional additive can be present from between 0 and 60% by weight referring to the total of the composition.

In accordance with the invention, the zeolitic components contain Si and they can also contain at least one T element chosen from among the group made up of Fe, Ga, Ti and B, and optionally also a maximum of 8% by weight of phosphorus.

The second component is preferably a faujasite zeolite selected from among ultra-stable type Y zeolites, exchanged faujasite zeolites selected from among ultra-stable type zeolites partially exchanged with rare earths (REUSY), ultra-stable type zeolites partially exchanged with rare earths and calcined (CREY).

The particle size of the composition can lie between 1 and 1000 micrometres or between 100 and 200 micrometres.

Moreover, the invention also refers to the use of compositions with the characteristics described above as a catalytic material in fluid catalytic cracking processes.

The invention furthermore refers to the use of a zeolitic material containing aluminium in its structure and selected from among ITQ-7 zeolites, intergrowths of ITQ-7 zeolites, ITQ-7 zeolites exchanged with rare earths, intergrowths of ITQ-7 zeolites exchanged with rare earths, and combinations of them, as catalytic materials in hydrocarbon catalytic cracking processes.

In this case too, the zeolitic material can be contained in particles embedding at least the zeolitic material in a matrix. In this case, the zeolitic material can consist of 10 to 70% by weight along with a matrix stabilised with phosphorus, and the matrix can also include particles of at least one binder selected from among silica, silica-alumina, alumina, $P_2O_5$ and combinations of them, and optionally, a conventional catalytic cracking additive as well. The binder is preferably present from 5 to 20% by weight referring to the total weight of the matrix, and in which the conventional additive is present from 0 to 60% by weight referring to the total weight of all the components.

As with the first zeolitic component described above, the zeolitic material contains Si and can also contain at least one T element chosen from among the group made up of Fe, Ga, Ti and B, and optionally also a maximum of 8% by weight of phosphorus, and it can have a particle size of between 1 and 100 micrometres or between 100 and 200 micrometres.

According to what has been stated above, the compositions of the invention can be created in various ways.

So, in a first type of catalytic composition, this contains in a single particle at least two catalytic components formed from, for example, Y faujasite zeolite as the second zeolitic component and ITQ-7 as the first zeolitic component. In order to create such a particle, a matrix is used preferably containing a binder agent such as silica, silica-alumina, alumina, $P_2O_5$ and mixtures of them. The final particle of the catalyst can also include conventional catalytic cracking additives such as clays. In the formulation desired with this type of catalytic composition for catalytic cracking in FCC units, the composition of ITQ-7 zeolite consists of at least one $T^{IV}$ element, among which Si and Ge are preferred, and at least one $T^{III}$ element, among which Al, B, Fe and Ga are preferred. Phosphorus can be added to the final zeolite. In its initial composition, the molar ratio between $T^{IV}$ and $T^{III}$ lies between 8 and 10000, and preferably between 20 and 1000. In no case must the quantity of alkaline metal, if present, exceed 0.25% by weight of $Na_2O$. In the event of adding phosphorus to the zeolite, the quantity of phosphorus added is between 0 and 8% by weight with respect to ITQ-7 zeolite. The phosphorus can be incorporated by impregnation in a solution, aqueous for example, of at least one acid or salt chosen from the among the group of $H_3PO_4$, $(NH_4)_3PO_4$, $(NH_4)_2HPO_4$, $(NH_4)H_2PO_4$. The product obtained is calcined at a temperature between 350 and 700° C.

The quantity of ITQ-7 zeolite and/or of the intergrowths of it that is preferred in this catalytic composition can lie between 2 and 40% by weight, with the quantity of Y faujasite zeolite being between 2 and 98% by weight, and in this case the rest of the particle formed by the matrix in which the binder is to be found lies between 5–20% by weight and the clay type additive is between 0–60% by weight with respect to the total catalyst.

ITQ-7 zeolite and intergrowths of it are clearly distinguished from any other zeolite previously used in catalysts for catalytic cracking by means of their X-ray diffractogram, which is given in Angew. Chem. Int Ed. 38, 1997 (1999) and in (Villaescusa, L. A., Factores directores de estructura en la sintesis de zeolitas en medio fluoruro. Doctoral thesis from the Polytechnic University of Valencia, Valencia, Spain, 1999). ITQ-7 zeolite has a three-dimensional topology with a system of pores and dimensions different from any other zeolite so far used in FCC catalysts. It is precisely this topology that gives rise to specific behaviour in cracking catalysts.

This zeolite can be synthesised in fluoride medium or in $OH^-$ medium using a structure director agent, such as for example 1,3,3-trimethyl-6-azoniumtricyclo $[3,2,1,4^{6,6}]$ dodecane, and forming a gel whose composition includes the source of one or more $T^{IV}$ elements and one or more $T^{III}$ elements. The synthesised zeolite is calcined at between 300 and 700° C. in such a way that, by direct synthesis and/or by means of post-synthesis exchange according to conventional methods, the acid form is obtained which is the preferred form in the catalytic composition forming the object of this patent.

ITQ-7 zeolite and/or intergrowths of it can be incorporated into a matrix via a mixture made up of the zeolite or zeolites, the binder and any conventional additive in FCC catalysts, such as kaolin for example, in order to create catalysts with various particle sizes. When an FCC catalyst is prepared, a suspension can be produced and then atomised in order thereby to create the catalyst particles. In the case of FCC units, particles of between 100 and 200 micrometres are preferred.

Y faujasite zeolite can be added to the cracking catalyst in various forms, such as HY, USY REY, CREY. These forms of Y zeolite have been described in: Venuto, P. B.; Fluid Catalytic Cracking with Zeolitic Catalysts, Marcel Dekker, N.Y., 1978; J. Scherzer, Octane Enhancing, Zeolitic FCC Catalysts, Marcel Dekker, 1990.

Another type of catalytic composition for catalytic cracking based on the use of ITQ-7 and/or intergrowths of it is based on obtaining a physical mixture of separate particles in which the zeolites are to be found in separate particles. So, for this formulation, each zeolite is incorporated separately into a matrix following a methodology analogous to the one described earlier, from the point of view of incorporation with a binder and a clay type coadjutant additive. So, the final mixture of the catalyst is made up of a mixture of at least two types of particle, in which one type of particle is formed from ITQ-7 and/or intergrowths of it in a matrix, and the other type of particle is formed from an FCC catalyst in which there exists Y faujasite zeolite in any of the different forms of Y faujasite already described. Moreover, a third type of particle can even be prepared containing a third zeolite, in which ZSM-5 is preferred, in a manner analogous to that described above with respect to the first two types of particle. Of course, and as is well known, an FCC final catalyst can also include other particles with the aim of, for example, improving fluidisation, trapping contaminants (for example metals, nitrogen, $Na^+$), converting beds, trapping SOx.

In the catalytic cracking composition described earlier, a physical mixture of separate particles is preferred in which the zeolitic components are found in the following proportions: Y zeolite in at least 20% by weight with respect to the total weight of zeolitic material, ITQ-y zeolite and/or intergrowths of it +ZSM-5 in a maximum of 80% by weight, in which the weight ratio of ZSM-5 zeolite and ITQ-7 zeolite and/or intergrowths of it lies between 10 and 0.

The compositions described above are of utility as cracking catalysts in FCC units and they permit $C_3$ and $C_4$ olefins to be efficiently obtained with high yields of gasoline.

WAYS OF DESIGNING THE INVENTION

Described below are some examples illustrating designs of the invention.

EXAMPLE 1
Preparation of a Sample Containing ITQ-7 Zeolite with Si and B in the Lattice.

13.46 g of tetraethylorthosilicate (TEOS) are hydrolysed in 31.98 g of a solution of 1,3,3-trimethyltricyclo-6-azonium-[3,2,1,4] dodecane hydroxide with a concentration of 0.99 mols per 1000 g of solution. 0.08 g of $H_3BO_3$ is added. The mixture is stirred and left to evaporate. Once all the ethanol formed has evaporated, 1.34 g of HF (48.1% by weight) is added along with 0.20 g of crystals of ITQ-7 type zeolite suspended in 2 g of water. It is left to evaporate until the composition of the mixture is:

$SiO_2$:0.01 $B_2O_3$:0.50 QOH:0.50 HF:3 $H_2O$ where QOH is 1,3,3-trimethyltricyclo-6-azonium-[3,2,1,4] dodecane hydroxide.

The resulting powder is introduced into a steel autoclave with an internal coating of teflon and kept in rotation (60 rpm) at 150° C. for 7 days. The content of the autoclave is filtered, washed with distilled water and dried at 100° C. The solid that is obtained is B-ITQ-7 with an Si/B ratio=50.

EXAMPLE 2
Preparation of a Sample Containing Acid ITQ-7 Zeolite with Si and Al in the Lattice.

B-ITQ-7 zeolite obtained in example 1 is calcined in air at 580° C. for 3 hours in order to eliminate the organic matter occluded in the pores. 1.0 g of calcined zeolite is introduced into a steel autoclave with an internal coating of teflon along with 10 ml of a solution of $Al(NO_3)_3 \cdot 9H_2O$ at 5% by weight, and it is kept at 135° C. for 48 hours. It is then filtered, washed to neutral pH and dried at 100° C. The solid obtained is an Al-ITQ-7 type zeolite with an Si/Al ratio=50.

EXAMPLE 3
Preparation of a Sample Containing Acid ITQ-7 Zeolite with Si, Ge and Al in the Lattice.

0.71 g of $GeO_2$ is dissolved in 38.60 g of a solution of 1,3,3-trimethyl-6-azoniumtricyclo [3,2,1,4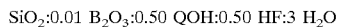] dodecane hydroxide with a concentration of $1.06 \times 10^3$ mols/g. 14.18 g of tetraethylorthosilicate (TEOS) and 0.61 g of aluminium isopropoxide are then hydrolysed, leaving the alcohol formed and part of the water to evaporate. Finally, 1.56 g of HF (48.1% by weight) is added, The final composition of the mixture is:

$SiO_2$:0.10 $GeO_2$:0.02 $Al_2O_3$:0.55 $C_{14}H_{26}NOH$:0.55 HF:3.30 $H_2O$ where QOH is 1,3,3-trimethyltricyclo-6-azonium-[3,2,1,4] dodecane hydroxide. After 7 days of crystallisation at 150° C. in a steel autoclave with an internal coating of teflon subjected to rotation (60 rpm), an Al/Ge-ITQ-7 type zeolite is obtained with an aluminium content of 1.2% by weight in the form of $Al_2O_3$.

EXAMPLE 4
Preparation of a Component of the Catalytic Cracking Catalyst Containing ITQ-7 Type Zeolite.

A catalyst was prepared by mixing ITQ-7 type zeolite in its acid form as described in example 2, and a silica, both in powder form and in a composition of 23% and 77% by weight of ITQ-7 type zeolite and $SiO_2$, respectively. The well-homogenised mixture was formed into a cake, ground in a mortar and then sieved taking the faction between 0.59 mm and 0.84 mm in diameter.

EXAMPLE 5
Preparation of a Component of the Catalytic Cracking Catalyst Containing USY Zeolite.

A catalyst is prepared by mixing USY zeolite (unit cell 2,432 nm, reference CBV720 of PQ Zeolites) and silica, both in powder form and in a composition of 67% and 33% by weight of USY and $SiO_2$, respectively. The well-homogenised mixture was formed into a cake, ground in a mortar and then sieved taking the faction between 0.59 mm and 0.84 mm in diameter.

EXAMPLE 6
Catalytic Cracking of a Vacuum Gasoil on the Catalyst Described in Example 4.

The catalytic component described in example 4 was used in the catalytic cracking whose composition is described in Table 1 using a MAT type fluid bed reactor described in (J. Catal, 165, 102 (997)).

TABLE 1

| Properties of vacuum gasoil | |
|---|---|
| Density (15° C.) g $cc^{-1}$ | 0.9172 |
| Aniline point (° C.) | 79.2 |
| Sulphur (% by weight) | 1.65 |
| Nitrogen (ppm) | 1261 |
| Na (ppm) | 0.18 |
| Cu (ppm) | <0.1 |
| Fe (ppm) | 0.30 |
| Ni (ppm) | 0.2 |
| V (ppm) | 0.40 |
| ASTM D-1160 (° C.) | |
| 5% | 319 |
| 10% | 352 |
| 30% | 414 |
| 50% | 436 |
| 70% | 459 |
| 90% | 512 |
| VASP (° C.) | 435 |
| K (UOP) | 11.82 |
| Mean molecular weight | 407 |
| Aromatic carbon (% weight) | 22.96 |
| Naphthenic carbon (% weight) | 15–16 |
| Paraffinic carbon (% weight) | 61.88 |

The reaction conditions were 520° C., reaction time of 30 seconds, 2.20 grams of catalyst and catalyst/feed ratios of 0.59, 0.73, 0.95, 1.35 and 2.38. The gases produced were analysed by gas chromatography, the liquids by simulated distillation (ASTM D-2887) and the coke was measured by analysis (IR) of the $CO_2$ formed during the combustion. The conversion is defined as the sum of the yields of gases $H_2$ and 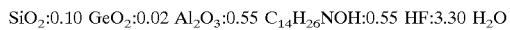 $C_1$–$C_4$, coke, gasoline (235.4° C.) and diesel (235.4–316.1° C). The results obtained are given in Table 2.

TABLE 2

| CAT/OIL | 0.59 | 0.73 | 0.95 | 1.35 | 2.38 |
|---|---|---|---|---|---|
| Conversion (%) | 28.36 | 32.48 | 36.01 | 43.61 | 55.45 |
| Yields (%) | | | | | |
| Gasoline | 12.76 | 15.49 | 17.12 | 21.01 | 25.34 |
| Diesel | 9.45 | 9.22 | 9.26 | 9.45 | 9.37 |
| Gases | 5.20 | 6.62 | 8.16 | 11.41 | 17.53 |
| Coke | 0.95 | 1.14 | 1.45 | 1.73 | 3.21 |
| Hydrogen | 0.019 | 0.026 | 0.036 | 0.047 | 0.085 |
| Methane | 0.17 | 0.21 | 0.24 | 0.34 | 0.66 |
| Ethane | 0.25 | 0.31 | 0.36 | 0.51 | 0.78 |
| Ethylene | 0.34 | 0.42 | 0.52 | 0.77 | 1.24 |
| Propane | 0.29 | 0.35 | 0.43 | 0.60 | 0.92 |
| Propylene | 1.31 | 1.67 | 2.10 | 2.97 | 4.66 |
| Isobutane | 0.60 | 0.74 | 0.91 | 1.27 | 2.07 |
| n-Butane | 0.16 | 0.20 | 0.24 | 0.33 | 0.49 |
| t2-Butene | 0.38 | 0.50 | 0.63 | 0.89 | 1.33 |
| 1-Butene | 0.42 | 0.55 | 0.68 | 0.93 | 1.36 |
| Isobutene | 0.94 | 1.22 | 1.49 | 2.02 | 2.84 |
| c2-Butene | 0.31 | 0.41 | 0.52 | 0.74 | 1.10 |
| Propylene/Propane | 4.58 | 4.71 | 4.91 | 4.98 | 5.05 |
| Butenes/butanes | 2.70 | 2.85 | 2.88 | 2.85 | 2.59 |
| Isobutene/Isobutane | 1.57 | 1.66 | 1.64 | 1.59 | 1.38 |
| C3–C4 Olefins/C3–C4 Saturates | 3.22 | 3.36 | 3.43 | 3.43 | 3.24 |

EXAMPLE 7

Catalytic Cracking of a Vacuum Gasoil on the Component Described in Example 5.

The catalytic component described in example 5 was used in the catalytic cracking whose composition is described in Table 1 following the same methodology as that used in example 6, with 1.5 grams of catalyst and cat/oil ratios of 0.40, 0.53, 0.80, 1.33 and 2.13. PIONA analysis was obtained for some of the experiments performed, and the results obtained are given in Table 3.

TABLE 3

| CAT/OIL | 0.40 | 0.53 | 0.80 | 1.33 | 2.13 |
|---|---|---|---|---|---|
| Conversion (%) | 49.23 | 60.84 | 68.39 | 76.60 | 81.63 |
| Yields (%) | | | | | |
| Gasoline | 23.62 | 29.85 | 31.74 | 32.15 | 30.05 |
| Diesel | 13.15 | 12.95 | 10.82 | 8.53 | 7.24 |
| Gases | 10.30 | 15.19 | 21.64 | 29.22 | 34.60 |
| Coke | 2.16 | 2.84 | 4.18 | 6.71 | 9.74 |
| Hydrogen | 0.04 | 0.05 | 0.08 | 0.14 | 0.20 |
| Methane | 0.37 | 0.50 | 0.80 | 1.29 | 1.87 |
| Ethane | 0.42 | 0.58 | 0.96 | 1.54 | 2.19 |
| Ethylene | 0.65 | 0.93 | 1.41 | 1.95 | 2.38 |
| Propane | 1.83 | 2.63 | 4.16 | 6.69 | 9.27 |
| Propylene | 1.51 | 2.31 | 3.13 | 3.56 | 3.69 |
| Isobutane | 2.99 | 4.44 | 6.08 | 7.78 | 8.25 |
| n-Butane | 1.03 | 1.50 | 2.22 | 3.18 | 3.81 |
| t2-Butene | 0.37 | 0.59 | 0.73 | 0.80 | 0.74 |
| 1-Butene | 0.40 | 0.62 | 0.75 | 0.80 | 0.73 |
| Isobutene | 0.38 | 0.57 | 0.72 | 0.85 | 0.88 |
| C2-Butene | 0.30 | 0.47 | 0.60 | 0.64 | 0.58 |
| Propylene/Propane | 0.82 | 0.88 | 0.75 | 0.53 | 0.40 |
| Butenes/butanes | 0.36 | 0.38 | 0.34 | 0.28 | 0.24 |
| Isobutene/Isobutane | 0.13 | 0.13 | 0.12 | 0.11 | 0.11 |
| C3–C4 Olefins/C3–C4 Saturates | 0.51 | 0.53 | 0.48 | 0.38 | 0.31 |
| PIONA | | | | | |
| Aromatics (%) | | | | 60.7 | 73.5 |
| Isoparaffins (%) | | | | 18.4 | 11.4 |
| Naphthenes (%) | | | | 8.5 | 6.0 |
| Olefins (%) | | | | 7.6 | 4.8 |
| Paraffins (%) | | | | 4.9 | 4.4 |
| RON | | | | 90.4 | 91.0 |

EXAMPLE 8

Catalytic Cracking of a Vacuum Gasoil on the Components Described in Examples 5 and 6.

The catalytic components described in examples 5 and 6 were used in the catalytic cracking of a vacuum gasoil whose characteristics are given in Table 1. The catalysts were arranged in two separate beds within the reactor, as described in the Journal of Catalysis 1997, 165 (1), p. 102. 1.5 grams of catalyst from example 6 were located in the upper zone and 1.14 g of catalyst from example 5 in the lower zone. The reaction conditions employed were the same as those of example 6, the amounts of gasoil that were fed being 3.76, 3.07, 2.35, 1.65 and 0.94 grams. The results obtained are shown in Table 4.

TABLE 4

| CAT/OIL | 0.76 | 0.93 | 1.21 | 1.72 | 3.02 |
|---|---|---|---|---|---|
| Conversion (%) | 56.88 | 71.99 | 82.16 | 87.02 | 92.90 |
| Yields (%) | | | | | |
| Gasoline | 27.02 | 35.86 | 40.33 | 42.82 | 40.71 |
| Diesel | 13.74 | 14.75 | 14.59 | 12.65 | 8.23 |
| Gases | 14.11 | 19.12 | 24.35 | 27.54 | 36.54 |
| Coke | 2.01 | 2.26 | 2.89 | 3.90 | 7.42 |
| Hydrogen | 0.039 | 0.049 | 0.066 | 0.070 | 0.130 |
| Methane | 0.37 | 0.45 | 0.62 | 0.73 | 1.31 |
| Ethane | 0.39 | 0.49 | 0.68 | 0.82 | 1.47 |
| Ethylene | 0.72 | 0.95 | 1.31 | 1.52 | 2.55 |
| Propane | 1.89 | 2.42 | 3.43 | 4.11 | 6.34 |
| Propylene | 2.54 | 3.48 | 4.26 | 4.84 | 5.68 |
| Isobutane | 3.94 | 5.40 | 7.07 | 8.00 | 11.05 |
| n-Butane | 1.19 | 1.61 | 2.25 | 2.73 | 3.80 |
| t2-Butene | 0.62 | 0.90 | 1.05 | 1.16 | 1.03 |
| 1-Butene | 0.68 | 0.99 | 1.14 | 1.23 | 1.03 |
| Isobutene | 1.21 | 1.61 | 1.57 | 1.47 | 1.30 |
| C2-Butene | 0.52 | 0.77 | 0.91 | 0.98 | 0.85 |
| Propylene/Propane | 1.34 | 1.44 | 1.24 | 1.18 | 0.90 |
| Butenes/butanes | 0.59 | 0.61 | 0.50 | 0.45 | 0.28 |
| Isobutene/Isobutane | 0.31 | 0.30 | 0.22 | 0.18 | 0.12 |
| C3–C4 Olefins/C3–C4 Saturates | 0.79 | 0.82 | 0.70 | 0.65 | 0.47 |
| PIONA | | | | | |
| Aromatics (%) | | 45.8 | 52.8 | | |
| Isoparaffins (%) | | 26.2 | 23.8 | | |
| Naphthenes (%) | | 11.4 | 9.8 | | |
| Olefins (%) | | 11.5 | 8.7 | | |
| Paraffins (%) | | 5.1 | 4.9 | | |
| RON | | 90.44 | 90.25 | | |

EXAMPLE 9

Preparation of a Composition for Catalytic Cracking Containing USY Zeolite and an ITQ-7 Type Zeolite in the Same Particle.

A catalyst was prepared by mixing 1.8 grams of USY zeolite, 0.36 grams of ITQ-7 type zeolite and 2.1 grams of $SiO_2$ and homogenising the mixture in a powder. This was formed into a cake, ground in a mortar and then sieved taking the faction 0.59–0.84 mm.

EXAMPLE 10

Catalytic Cracking of a Vacuum Gasoil on the Catalyst Containing ITQ-7 Type and USY Zeolite in the Same Particle Described in Example 9.

The catalyst described in example 9 was used in the catalytic cracking of a vacuum gasoil (Table 1) following the methodology used in example 6, using 2.84 grams of catalyst and cat/oil ratios of 0.76, 0.93, 1.21, 1.72 and 3.02. The results obtained are shown in Table 5.

TABLE 5

| CAT/OIL | 0.76 | 0.93 | 1.21 | 1.72 | 3.02 |
|---|---|---|---|---|---|
| Conversion (%) | 61.19 | 76.47 | 82.39 | 87.30 | 90.62 |
| Yields (%) | | | | | |
| Gasoline | 33.26 | 42.09 | 43.43 | 43.41 | 37.60 |
| Diesel | 11.25 | 11.83 | 9.96 | 8.79 | 4.62 |
| Gases | 14.44 | 20.15 | 25.72 | 30.97 | 40.94 |
| Coke | 2.24 | 2.40 | 3.27 | 4.13 | 7.46 |
| Hydrogen | 0.041 | 0.051 | 0.072 | 0.103 | 0.192 |
| Methane | 0.39 | 0.50 | 0.69 | 1.01 | 1.70 |
| Ethane | 0.43 | 0.56 | 0.79 | 1.17 | 1.95 |
| Ethylene | 0.79 | 1.03 | 1.39 | 1.86 | 2.68 |
| Propane | 1.98 | 2.62 | 3.65 | 5.25 | 8.95 |
| Propylene | 2.50 | 3.57 | 4.31 | 4.59 | 4.96 |
| Isobutane | 4.50 | 6.28 | 8.15 | 9.82 | 12.89 |
| n-Butane | 1.28 | 1.75 | 2.40 | 3.19 | 4.65 |
| t2-Butene | 0.61 | 0.93 | 1.09 | 1.03 | 0.76 |
| 1-Butene | 0.66 | 1.01 | 1.16 | 1.07 | 0.73 |
| Isobutene | 0.76 | 1.05 | 1.08 | 1.02 | 0.85 |
| C2-Butene | 0.50 | 0.79 | 0.92 | 0.85 | 0.63 |
| Propylene/Propane | 1.26 | 1.37 | 1.18 | 0.87 | 0.55 |
| Butenes/butanes | 0.44 | 0.47 | 0.40 | 0.31 | 0.17 |
| Isobutene/Isobutane | 0.17 | 0.17 | 0.13 | 0.10 | 0.07 |
| C3–C4 Olefins/C3–C4 Saturates | 0.65 | 0.69 | 0.60 | 0.47 | 0.30 |

EXAMPLE 11

Catalytic Cracking of a Vacuum Gasoil on the Components Described in Examples 5 and 6 Treated with Steam.

The catalytic components described in examples 5 and 6 were hydrothermically treated in an atmosphere of 100% steam at 750° C. for five hours and were used in the catalytic cracking of a vacuum gasoil following the same methodology as described in example 8.

The results are shown in table 6.

TABLE 6

| CAT/OIL | 0.76 | 0.93 | 1.21 | 1.72 | 3.02 |
|---|---|---|---|---|---|
| Conversion (%) | 19.71 | 23.42 | 27.96 | 34.15 | 48.18 |
| Yields (%) | | | | | |
| Gasoline | 7.97 | 9.89 | 12.66 | 16.47 | 24.32 |
| Diesel | 9.44 | 10.36 | 10.94 | 11.92 | 13.27 |
| Gases | 1.78 | 2.51 | 3.63 | 5.05 | 9.32 |
| Coke | 0.51 | 0.65 | 0.74 | 0.70 | 1.27 |
| Hydrogen | 0.008 | 0.011 | 0.017 | 0.024 | 0.044 |
| Methane | 0.13 | 0.17 | 0.21 | 0.26 | 0.42 |
| Ethane | 0.20 | 0.27 | 0.36 | 0.46 | 0.75 |
| Ethylene | 0.23 | 0.31 | 0.37 | 0.54 | 0.90 |
| Propane | 0.19 | 0.26 | 0.37 | 0.48 | 0.81 |
| Propylene | 0.43 | 0.61 | 0.88 | 1.23 | 2.29 |
| Isobutane | 0.07 | 0.10 | 0.15 | 0.24 | 0.54 |
| n-Butane | 0.08 | 0.12 | 0.19 | 0.25 | 0.46 |
| t2-Butene | 0.09 | 0.13 | 0.21 | 0.32 | 0.66 |
| 1-Butene | 0.12 | 0.18 | 0.28 | 0.39 | 0.74 |
| Isobutene | 0.17 | 0.25 | 0.40 | 0.59 | 1.17 |
| C2-Butene | 0.07 | 0.10 | 0.17 | 0.26 | 0.54 |
| Propylene/Propane | 2.29 | 2.33 | 2.35 | 2.54 | 2.81 |
| Butenes/butanes | 2.93 | 3.11 | 3.20 | 3.13 | 3.11 |
| Isobutene/Isobutane | 2.47 | 2.56 | 2.70 | 2.43 | 2.18 |
| C3–C4 Olefins/C3–C4 Saturates | 2.57 | 2.68 | 2.76 | 2.84 | 2.98 |
| PIONA | | | | | |
| Aromatics (%) | | | | | 44.30 |
| Isoparaffins (%) | | | | | 15.42 |
| Naphthenes (%) | | | | | 13.23 |
| Olefins (%) | | | | | 18.30 |
| Paraffins (%) | | | | | 8.66 |

What is claimed is:

1. A catalytic composition for hydrocarbons cracking containing at least two zeolitic components of which at least one first zeolitic component containing aluminium in its structure is selected from among ITQ-7 zeolites, intergrowths of ITQ-7 zeolites, ITQ-7 zeolites exchanged with rare earths, intergrowths of ITQ-7 zeolites exchanged with rare earths, and combinations of them.

2. A composition according to claim 1, in which the first component is present in a proportion of between 2 and 40% of the total weight of zeolitic components present in the composition.

3. A composition according to claim 1, which consists of particles containing at least the first zeolitic component embedded in a matrix.

4. A composition according to claim 1, in which at least part of the zeolitic components of the composition is made up of particles that consist of at least the first zeolitic component.

5. A composition according to claim 1, in which at least part of each of the zeolitic components is present in particles that consist of just one zeolitic component.

6. A composition according to claim 1, in which the zeolitic components consist of, as well as the first zeolitic component, at least a second zeolitic component selected from among faujasite zeolites, faujasite zeolites at least partially exchanged with rare earths, cracking catalysts based on faujasite and combinations of them.

7. A composition according to claim 6, which, with respect to the total weight of zeolitic components, consists of:
   2–40% by weight of the first zeolitic component,
   2–98% by weight of the second zeolitic component.

8. A composition according to claim 6 or 7, in which the first zeolitic component is embedded in a matrix stabilised with phosphorus in which the weight of the first zeolitic component referring to the sum of the weights of the first zeolitic components and of the matrix lies between 10 and 70% by weight.

9. A composition according to claim 7, which consists of a mixture of particles of zeolitic components which includes
   particles of the first component in a matrix,
   particles of the second component, and
   particles of ZSM-5 zeolite in a matrix.

10. A composition according to claim 8, which consists of a mixture of particles of zeolitic components which includes
   particles of the first component in a matrix,
   particles of the second component, and
   particles of ZSM-5 zeolite in a matrix.

11. A composition according to claim 9, in which the mixture of particles of zeolitic components consists of a maximum of 80% by weight of particles corresponding to the first component in the matrix and ZSM-5 zeolite in a ratio by weight of ZSM-5 zeolite/first component$\leq$10, and at least 20% of the second component.

12. A composition according to claim 10, in which the mixture of particles of zeolitic components consists of a maximum of 80% by weight of particles corresponding to the first component in the matrix and ZSM-5 zeolite in a ratio by weight of ZSM-5 zeolite/first component$\leq$10, and at least 20% of the second component.

13. A composition according to claim 8, in which the matrix consists of particles of at least one binder selected from among silica, silica-alumina, alumina, $P_2O_5$ and combinations of them, and optionally, a conventional catalytic cracking additive as well.

14. A composition according to claim 13, in which the binder is present from 5 to 20% by weight referring to the total weight of the matrix, and the conventional additive is present from between 0 and 60% by weight referring to the total of the composition.

15. A composition according to claim 1, in which the zeolitic components contain Si and at least one T element chosen from among the group made up of Fe, Ga, Ti and B.

16. A composition according to claims 13 or 15, in which the zeolitic components also contain a maximum of 8% by weight of phosphorus.

17. A composition according to claim 6, in which the second component is a faujasite zeolite selected from among ultra-stable type Y zeolites.

18. A composition according to claim 6, in which the second zeolitic component is an exchanged faujasite zeolite selected from among ultra-stable type zeolites partially exchanged with rare earths (REUSY).

19. A composition according to claim 6, in which the second zeolitic component is an exchanged faujasite zeolite selected from among ultra-stable type zeolites partially exchanged with rare earths and calcined (CREY).

20. A composition according to claim 1, composed of particles with a size between 1 and 1000 micrometres.

21. A composition according to claim 1, composed of particles with a size between 100 and 200 micrometres.

* * * * *